United States Patent [19]

Lüers et al.

[11] Patent Number: 5,221,337
[45] Date of Patent: Jun. 22, 1993

[54] SIO₂ FLATTING AGENT, PROCESS FOR ITS PRODUCTION AND ITS USE

[75] Inventors: Georg Lüers, Westhofen; Gerd W. Scheuren, Worms; Heiko Zeh, Weiterstadt, all of Fed. Rep. of Germany

[73] Assignee: W. R. Grace & Co.-Conn., New York, N.Y.

[21] Appl. No.: 785,900

[22] Filed: Nov. 1, 1991

Related U.S. Application Data

[63] Continuation of Ser. No. 653,536, Feb. 11, 1991, abandoned.

[30] Foreign Application Priority Data

Feb. 14, 1990 [DE] Fed. Rep. of Germany ....... 4004468
Oct. 15, 1990 [DE] Fed. Rep. of Germany ....... 4032619

[51] Int. Cl.⁵ .................... C09D 191/00; C09D 7/12
[52] U.S. Cl. .................... 106/266; 106/489; 106/491; 106/245; 106/253; 106/287.26; 106/287.34
[58] Field of Search ............... 106/489, 491, 266, 245, 106/287.26, 287.34, 253

[56] References Cited

U.S. PATENT DOCUMENTS

| | | | |
|---|---|---|---|
| 2,838,413 | 6/1958 | Young | 106/272 |
| 3,436,241 | 4/1969 | Durrant | 106/308 |
| 3,607,337 | 9/1971 | Elsenmenger et al. | 106/288 |
| 4,038,224 | 7/1977 | Eisenmenger et al. | 106/491 |
| 4,173,491 | 11/1979 | Abrams et al. | 106/288 |
| 4,839,163 | 6/1989 | Busch, Jr. | 106/491 |

FOREIGN PATENT DOCUMENTS

| | | | |
|---|---|---|---|
| 590894 | 1/1960 | Canada | 106/491 |
| 795691 | 10/1968 | Canada | 106/491 |
| 1006100 | 4/1957 | Fed. Rep. of Germany | |
| 2521361 | 11/1976 | Fed. Rep. of Germany | 106/491 |
| 1395700 | 5/1975 | United Kingdom | |

OTHER PUBLICATIONS

Parry et al, *Chemical Engineer's Handbook*, McGraw-Hill, N.Y., 1973, pp. 20-58-20-61. (no month).

Hackh's Chemical Dictionary, Fourth Edition, p. 678, 1967 (no month).

"Resinotes 31", 1979. Cray Valley Products, Inc. pp. 1-3 (no month).

"CVP Thixotropic," Cray Valley Products Limited, Farnborough, England, Nov. 1988, pp.: cover, 1 and 3.

*Primary Examiner*—David Brunsman
*Attorney, Agent, or Firm*—Steven Capella

[57] ABSTRACT

A universally applicable $SiO_2$-flatting agent is described, which consists of $SiO_2$, 1 to 25% by weight polyol and optionally 1 to 25% by weight wax. The novel flatting agent is, even after lengthy storage, especially at pressure, still easily dispersible, does not lead to the formation of a hard sediment with non-thixotropic paints and lacquers, and has practically no negative effect on the thixotropic behaviour of paints and lacquers based on thixotropic polyamide-modified alkyd resins. The $SiO_2$, polyol and wax can be brought together in a variety of ways, e.g. during the micronization of the $SiO_2$ in a jet-mill or mechanical mill by adding polyol and wax at the same time, by spray-drying a suspension of $SiO_2$ in an aqueous polyol solution or even before drying by adding polyol during washing or an earlier production step. It is also possible to spray-dry a suspension of $SiO_2$, wax emulsion and polyol.

8 Claims, No Drawings

őcenie# $SiO_2$ FLATTING AGENT, PROCESS FOR ITS PRODUCTION AND ITS USE

This is a continuation of application Ser. No. 653,536, filed Feb. 11, 1991 abandoned.

FIELD OF THE INVENTION

The invention relates to a universally applicable $SiO_2$-flatting agent, a process for its production and its use in thixotropic and non-thixotropic paints and lacquers.

BACKGROUND OF THE INVENTION

The problem with thixotropic paints and lacquers based on polyamide-modified alkyd resins (see e.g. U.S. Pat. No. 2,663,649) is that the components additionally present in the lacquer, particularly hydroxyl group-containing solvents such as, for example, alcohols, glycols and some organic paint pigments (e.g. phthalocyanine blue, Hansa yellow and Bordeaux red), have a negative effect on the thixotropy. However, $SiO_2$-flatting agents also have a similar effect.

Immediately after being produced, fine-particled $SiO_2$-flatting agents can be easily de-agglomerated into individual particles with the application of low shearing forces when incorporated into lacquer. This behaviour is desirable because remaining agglomerates lead to clearly visible specks in the applied lacquer film. However, if fine-particled $SiO_2$-flatting agents are subjected to a pressure, more solid agglomeration can result. This effect is increased if the pressure is exerted over a lengthy period of time. This can cause the good dispersibility of a product which initially has excellent dispersibility, to deteriorate during storage because of stress such as can occur during storage and transportation, whereupon said product is judged unacceptable by the user.

In thixotropic paints and lacquers, because of their gel-like properties, no sedimentation of flatting agents or pigment particles is observed. The particles remain in their position and cannot form a hard, non-dispersible sediment during storage. Exposure to shearing forces causes the viscosity of the system to fall substantially and the particles begin to settle. The particular feature of a thixotropic paint is that the viscosity is very rapidly restored as soon as the mechanical stress ceases. After a short time the paint once again has its original gel-like consistency, which prevents a further settling of the particles.

In a non-thixotropic paint, however, the situation is completely different, because here the $SiO_2$-flatting agent particles settle and form a hard sediment. It is very difficult, and in many cases impossible, to re-disperse this sediment into the individual particles again with the equipment common in the paint and lacquer industry.

The formation of a hard sediment can be prevented by coating the flatting agent particles with wax. DE-PS 1 006 100 and DE-AS 1 592 865 describe how the $SiO_2$-flatting agent particles can be coated with wax and which waxes can be used.

OBJECTS OF THE INVENTION

Therefore it is an object of the invention to provide a $SiO_2$-flatting agent with the least possible negative effect or without any negative effect on the thixotropic behaviour of un-flatted thixotropic paints and lacquers based on polyamide-modified alkyd resins.

It is a further object of the invention to provide a $SiO_2$-flatting agent which still has good dispersibility even after lengthy storage, particularly under pressure.

It is also an object of the invention to provide a $SiO_2$-flatting agent which does not lead to the formation of a hard sediment with non-thixotropic paints and lacquers.

It is an additional object of the invention to provide a $SiO_2$-flatting agent which is universally applicable.

SUMMARY OF THE INVENTION

The invention is directed to a $SiO_2$-flatting agent which is characterized in that it consists of $SiO_2$ and 1 to 25% by weight polyol. Preferably said $SiO_2$-flatting agent additionally contains 1 to 25% by weight wax.

A further subject of the invention is a process for the production of a $SiO_2$-flatting agent which is characterized in that $SiO_2$ is brought together with such an amount of polyol that the polyol content of the finished flatting agent is from 1 to 25% by weight. Preferably also such amount of wax is added that the wax content of the finished flatting agent is from 1 to 25% by weight.

Another subject of the invention is the use of the $SiO_2$-flatting agent according to the invention for the production of thixotropic and non-thixotropic paints and lacquers.

Preferred embodiments and advantages of the invention will become apparent from the following detailed description of the invention and the claims.

DETAILED DESCRIPTION OF THE INVENTION

It was surprisingly found that the negative effect of $SiO_2$-based flatting agents on the thixotropy of paints and lacquers based on thixotropic polyamide-modified alkyd resins can be greatly reduced, or eliminated, by the co-use of polyhydric alcohols. The affinity between the $SiO_2$ surface and the polyol is so great that even when the $SiO_2$ and the polyol are added separately to thixotropic paints and lacquers based on alkyd resins the polyol molecules are adsorbed by the $SiO_2$ surface. In other words, the modification according to the invention of $SiO_2$-flatting agents consists in impregnating or coating the $SiO_2$ surface with polyols. The realization that polyols eliminate the negative effect of the hydroxyl groups on the $SiO_2$ surface is particularly surprising because alcohols and glycols in particular are known as substances which greatly impair the thixotropy of polyamide-modified alkyd resins. For example, a manufacturer of thixotropic polyamide-modified alkyd resins expressly points out that hydroxyl groups, as present in alcohols and glycols, completely destroy the thixotropic structure.

It was further surprisingly found that the good dispersibility of the fine-particled $SiO_2$-flatting agents remains even during storage, and particularly during storage under pressure, if the $SiO_2$ surface is impregnated with a polyol.

Finally, it was surprisingly found that the impregnation or coating of the $SiO_2$-flatting agent surface with polyols according to the invention is effective not only with pure but also with wax-coated flatting agents. This means, in other words, that the polyol applied according to the invention does not impair the effectiveness of the wax in terms of preventing the flatting-agent particles from settling and forming a hard sediment. Vice versa, the wax obviously does not have a negative effect on the thixotropy of thixotropic paints and lacquers, or on the improvement in dispersibility of $SiO_2$-flatting agents that can be achieved by polyol impregnation after lengthy storage. The preferred $SiO_2$-flatting agent according to the invention can thus be applied universally not only in thixotropic but also in non-thixotropic paints and lacquers.

Alcohols of higher valence are suitable for the treatment of the $SiO_2$ surface according to the invention, particularly di- to hexahydric alcohols with, e.g., 2 to 100 carbon atoms, in which the carbon chains can be linear or branched and can be interrupted by any number of oxygen atoms (C—O—C groups=ethers). The OH-groups can be situated at any position. Mixtures of the named polyols can, of course, also be used.

Examples of polyols which are suitable according to the invention include glycerin, ethylene glycol, diethylene glycol, polyethylene glycols, sorbitol, trimethylolpropane, di- trimethylolpropane, ethoxylated trimethylolpropanes, pentaerythritol and ethoxylated pentaerythritols.

With reference to waxes suitable according to the invention, reference is made to the aforementioned DE-PS 1 006 100 and DE-AS 1 592 865. Microcrystalline hard waxes, polyethylene waxes and partially oxidized polyethylene waxes, which have proved to be well suited, are mentioned in particular.

$SiO_2$-flatting agents are in most cases silica gels or precipitated silicic acids (also called precipitated silica). Pyrogenic silicic acids (or pyrogenic silicas) in the usual form are not used as flatting agents; there is, however, a form produced by secondary agglomeration which is likewise used as a flatting agent. Suitable are also dialytic silicic acids (or dialytic silicas). The particle size and particle-size distribution of the $SiO_2$-flatting agent lie within the usual ranges known to the expert.

The flatting agent according to the invention is prepared by bringing together $SiO_2$ with polyol and optionally wax. This is preferably done by micronizing the $SiO_2$ in a jet-mill or a mechanical mill, followed where appropriate by classification, and adding the polyol and optionally the wax (in melted form or as a powder) at the same time as the $SiO_2$. Another possibility is to spray-dry a suspension of $SiO_2$ in an aqueous polyol solution, to impregnate the resulting polyol-impregnated $SiO_2$, if desired, in the conventional manner with wax (see e.g. DE-PS 1 006 100 and DE-AS 1 592 865), and to adjust the $SiO_2$, now impregnated with polyol and optionally wax, to the suitable particle-size distribution by air-classification or jet-milling. Alternatively, a suspension of $SiO_2$, wax emulsion and polyol can be spray-dried. The $SiO_2$ can also already be impregnated with polyol before drying by introducing polyol into the liquid phase surrounding the hydrogel or by adding polyol to the wash-water during washing (e.g. of the hydrogel in the case of silica gel) or impregnating the $SiO_2$ even earlier in the hydrosol state, by adding the polyol to the water glass or to the diluted sulphuric acid during the precipitation of the $SiO_2$. The polyol-treated $SiO_2$ which is obtained according to one of these methods can then be impregnated with wax as described previously and adjusted to the suitable particle size distribution.

Alternatively, $SiO_2$ or wax-impregnated $SiO_2$ and polyol can be incorporated into the paint or lacquer as separate components.

The advantageous effect of the modification of $SiO_2$-flatting agents with polyols according to the invention is probably due to the fact that the OH-groups of the $SiO_2$ surface are masked by addition and bonding via hydrogen-bridge bonds. It is decisive here for several OH-groups or ether groups to be present per molecule to surpass the necessary adhesion vis-a-vis other polar molecules, e.g. water. Compared with the known esterification of OH groups on $SiO_2$ surfaces with alcohols, which is connected with a distinct enthalpy change, the difference according to the invention is that the modification of $SiO_2$-flatting agents with polyols takes place spontaneously but without noticeable enthalpy change. Accordingly, the production of the $SiO_2$-flatting agent according to the invention or the modification with polyol takes place basically below the temperature at which an esterification would take place, i.e. generally below 150° C., preferably below 100° C. and especially at ambient temperature or an only slightly higher temperature.

Generally, 1 to 25% by weight polyol and in addition preferably 1 to 25% by weight wax, both relative to the weight of the $SiO_2$-flatting agent, are required for the modification of $SiO_2$-flatting agents according to the invention. Amounts of 3 to 15% by weight polyol and 3 to 10% by weight wax are preferred.

Practice of the invention will become further apparent from the following non-limiting examples.

EXAMPLE 1 a

A $SiO_2$-flatting agent with an average particle size of 5 μm (measured with a Coulter Counter), a BET surface of 400 $m^2/g$ and a pore volume (both determined by nitrogen adsorption) of 1.75 ml/g was dispersed using a so-called dissolver (a high-speed stirring device with high shearing forces frequently used in the paint and lacquer industry for the dispersion of pigments and fillers) into a thixotropic lacquer containing a polyamide-modified thixotropic alkyd resin as its main component. The composition of the lacquer is given in the following table. The concentration of the flatting agent, relative to the solids content of the lacquer, was 9% by weight. The flatted lacquer was stored for 24 hours at 20° C. and then the viscosity was determined with the Haake viscosimeter (Haake RV3 Rotovisko, measuring head 500, spindle MV1). The measurement was carried out at 20° C. A flow curve was determined from 0 to 32 rpm with a rotation-frequency change of 25 rpm/min/-min. The viscosity was read off at 8 rpm from the curve with an increasing frequency of rotation. The results obtained are reproduced in Table 1.

| Lacquer composition | parts by weight |
|---|---|
| Polyamide-modified thixotropic alkyd resin, 50% | 70 |
| urethane alkyd resin, 55% | 18.2 |
| barium-, cobalt- and lead octoate[1] | 2.1 |
| wetting agent (Worléadd 356, 30%) | 0.4 |
| de-foamer (Byk 053, 20%) | 0.2 |
| levelling agent (Baysilon MA, 1%) | 0.5 |
| anti-skin agent (Ascinin R 55) | 0.8 |
| white spirit K30 (turpentine substitute) | 7.8 |
| | 100.00 |

[1]catalysts for drying by oxidation

After six weeks storage of the lacquer at room temperature no sediment was observed.

EXAMPLE 1b

The $SiO_2$-flatting agent from Example 1a was impregnated with a wax by adding the wax into the jet mill at the same time as the $SiO_2$. The thus impregnated flatting agent, containing 10% by weight wax, was incorporated into the same lacquer as in Example 1a and tested as described there. The results are likewise reproduced in Table 1.

EXAMPLE 2

The lacquer used in Example 1a was treated as in Example 1, but without the addition of a flatting agent. The corresponding tests were carried out with this lacquer and the results are likewise reproduced in Table 1.

EXAMPLE 3

The $SiO_2$-flatting agent used in Example 1a was already impregnated with a polyethylene glycol (molecular weight 400) during the micronization in the jet-mill, the polyethylene glycol being added into the jet-mill at the same time as the $SiO_2$. The polyethylene glycol concentration in the flatting agent was 8.5% by weight. The thus impregnated flatting agent was incorporated into the same lacquer as in Example 1a and tested as described there. The concentration of the flatting agent, relative to the solids content of the lacquer, was 9% by weight. The results are again reproduced in Table 1.

EXAMPLE 4 a

The $SiO_2$-flatting agent used in Example 1a was introduced into a non-thixotropic lacquer based on a nitrocellulose resin. The composition of the lacquer is given in the following table. The lacquer containing the flatting agent was kept for 6 weeks in a glass cylinder before the hardness of a sediment which may have formed was evaluated. The hardness was determined with a glass rod. The resistance felt on moving the sediment is the subjective criterion for evaluating the hardness.

The untreated flatting agent used in this example did form a hard sediment.

| Lacquer composition | parts by weight |
| --- | --- |
| Nitrocellulose chips | 12.6 |
| toluene | 30.0 |
| butanol | 5.6 |
| ethyl acetate | 6.0 |
| methyl isobutyl ketone | 20.0 |
| plasticizer (Edenol 344, Henkel) | 2.3 |
| silicone oil (L 050 10% in MIBK) | 1.0 |
| alkyd resin/60% in xylene | 22.5 |
| | 100.0 |

EXAMPLE 4b

Instead of the non-coated flatting agent from Example 1a, the wax-impregnated flatting agent from Example 1b was tested in the manner described in Example 4a with reference to sedimentation behaviour. In contrast to Example 4a, the wax-impregnated flatting agent led to a very soft and easily redispersible deposit.

EXAMPLE 5

Instead of the non-coated flatting agent from Example 1a, the polyol-impregnated flatting agent according to Example 3 was tested with reference to sedimentation behaviour as described in Example 4a. The $SiO_2$-flatting agent impregnated with 8.5% by weight polyethylene glycol led to the formation of a hard deposit.

EXAMPLE 6

The $SiO_2$-flatting agent used in Example 1a was already impregnated with a polyethylene glycol (molecular weight 400) and a wax during the micronization in the jet-mill, polyethylene glycol and wax being fed into the jet-mill at the same time as the $SiO_2$. The polyethylene glycol concentration in the flatting agent was 7.5% by weight and the wax concentration was 4% by weight. The impregnated flatting agent was incorporated into
a) the same lacquer as in Example 1a and
b) the same lacquer as in Example 4a.

The results obtained with these lacquers are likewise given in Table 1.

The flatting agent of this Example led to the formation of a voluminous, very soft and easily redispersible sediment.

EXAMPLE 7

The polyethylene glycol in Example 6 was replaced by a polyol with 4 OH-groups and a molecular weight of 270. The impregnated flatting agent was again incorporated into
a) the same lacquer as in Example 1a and
b) the same lacquer as in Example 4a.

The results obtained here are also reproduced in Table 1.

The flatting agent of this Example brought about the formation of a voluminous, very soft and easily redispersible sediment.

EXAMPLE 8a

The $SiO_2$-flatting agent according to Example 3 was incorporated into a non-thixotropic lacquer based on a polyurethane resin. The lacquer composition is reproduced in the following table. It is a representative example for lacquers commonly on the market. The sedimentation behaviour was tested as in Example 4a. The flatting agent treated with polyethylene glycol led to the formation of a hard sediment.

| Lacquer composition | parts by weight |
| --- | --- |
| Urethane-alkyd resin, 55% in white spirit | 91.3 |
| turpentine | 1.0 |
| white spirit (turpentine substitute) | 4.0 |
| lead (naphthenate (24% Pb) | 0.83 |
| cobalt naphthenate (6% Co) | 0.33 |
| calcium naphthenate (4% Ca) | 1.27 |
| anti-skin agent (Ascinin R 55) | 1.27 |
| | 100.00 |

EXAMPLE 8b

Instead of the flatting agent according to Example 3, the flatting agent from Example 1b was tested as described in Example 8a. The formation of a very soft sediment, which was very easily redispersible, was observed.

EXAMPLE 9

In this example the $SiO_2$-flatting agent impregnated with polyethylene glycol and wax was incorporated into the lacquer described in Example 8a and tested in the same manner. This flatting agent led to the formation of a voluminous, very soft and easily redispersible sediment.

TABLE 1

| Example | Flatting agent composition | Flatting agent concentration in lacquer | Lacquer composition according to example | Viscosity (mPa · s) | Sediment after six weeks' storage |
|---|---|---|---|---|---|
| 1a | $SiO_2$ | 9 | 1a | 1405 | no sediment |
| 1b | $SiO_2$ + Wax | 9 | 1a | 1300 | no sediment |
| 2 | no flatting agent | 0 | 1a | 3795 | — |
| 3 | $SiO_2$ + PEG | 9 | 1a | 3950 | no sediment |
| 4a | $SiO_2$ | 5 | 4a | — | hard sediment |
| 4b | $SiO_2$ + Wax | 5 | 4a | — | very soft sediment |
| 5 | $SiO_2$ + PEG | 5 | 4a | — | hard sediment |
| 6 | $SiO_2$ + PEG + Wax | 5 | a) 1a | 3810 | no sediment |
|   |   |   | b) 4a | — | very soft deposit |
| 7 | $SiO_2$ + Polyol + Wax | 5 | a) 1a | 3690 | no sediment |
|   |   |   | b) 4a | — | very soft sediment |
| 8a | $SiO_2$ + PEG | 7 | 8a | — | hard sediment |
| 8b | $SiO_2$ + Wax | 7 | 8a | — | very soft sediment |
| 9 | $SiO2$ + PEG + Wax | 7 | 8a | — | very soft sediment |

PEG: polyethylene glycol
Polyol: polyol with 4 OH groups and a molecular weight of 270
—: not measured

EXAMPLE 10

Various flatting agents with two different particle sizes were prepared in the manner described in the foregoing examples. The composition of the flatting agents in each case is given in Table 2. Several bags of the test products were stored together with untreated standard flatting agents for 6 weeks on palettes. Storage was carried out once with and once without an additional load of 200 kg/palette.

After the six weeks storage, 3 samples were taken from different bags. The dispersibility was evaluated according to the standard dispersion test described below. All samples were coded so that the testers were unable to identify the samples. The results are likewise reproduced in Table 2. The effectiveness of the polyol impregnation is especially noticeable for the samples which were previously subjected to a load. Moreover, the test results show that the simultaneous impregnation with wax does not have a negative influence on the positive effect achieved by impregnation with polyol.

Standard Dispersion Test

Testing was carried out on the lacquer described according to Example 4a.

Before use, the lacquer is set with MIBK to an outflow time of 70–85 seconds (beaker 4 mm orifice/DIN 53211). 1.5 g flatting agent per 80 g lacquer are shaken with a Red Devil Paint Shaker for 40 seconds in a plastic beaker (diameter 6.5 cm, height 7.0 cm, 190 ml). After deaeration, the samples are briefly agitated once more and drawn on to control cards using a 150 μm drawing spiral under dust-free conditions.

After 10 minutes the control cards are graded against standard cards. Rating 1 signifies that the lacquer coating is completely free of specks. The scale extends to 5. Rating 5 characterizes a lacquer coating with very many specks.

TABLE 2

| Sample | Flatting agent composition | Particle size (μm) (2) | Carbon content (%) | Dispersibility* after 6 weeks' storage with a load per palette of | |
|---|---|---|---|---|---|
| | | | | 0 kg | 200 kg |
| 1 | 100% $SiO_2$ | 3.4 | 0 | 1.2 | 3.9 |
| 2 | 90% $SiO_2$, 10% PEG(1) | 3.5 | 6.8 | 1.3 | 2.5 |
| 3 | 100% $SiO_2$, | 5.3 | 0 | 1.4 | 3.1 |
| 4 | 90% $SiO_2$, | 5.2 | 7.5 | 1.0 | 1.8 |
| 5 | 10% PEG(1) 90% $SiO_2$, 10% Wax | 5.2 | 8.3 | 1.2 | 2.8 |
| 6 | 80% $SiO_2$, 9% Wax 11% PEG(1) | 5.3 | 14.2 | 1.0 | 1.5 |

*measured according to the afore-mentioned Standard Dispersion Test; rating 1 = very good; 5 = very bad
(1) polyethylene glycol molecular weight 400
(2) measured with the Coulter Counter

EXAMPLE 11

The $SiO_2$ flatting agent used in Example 1a was already impregnated with glycerin during the micronization in the jet-mill by adding glycerin into the jet-mill at the same time as the $SiO_2$. The glycerin concentration in the flatting agent was 11% by weight. The thus impregnated flatting agent was incorporated into the same lacquer as in Example 1a and tested as described there. The results are reproduced in Table 3.

EXAMPLE 12

Example 11 was repeated but with the addition of a polyol with 4 OH-groups and a molecular weight of 270 instead of glycerin during the micronization in the jet-mill. The polyol-concentration in the flatting agent was 12.5% by weight. The mixture was incorporated into the lacquer and tested as in Example 1a. The results are reproduced in Table 3.

EXAMPLE 13

Example 1a was repeated but with a polyol with 4 OH-groups and a molecular weight of 270 in a concentration of 1.1% by weight added in dispersion at the same time as 7.9% by weight of $SiO_2$. The results of the tests are again reproduced in Table 3.

EXAMPLE 14

Example 13 was repeated but, instead of the polyol with 4 OH-groups, a polyethylene glycol (molecular weight 400) was used. The concentration of the flatting agent, referred to the solids content of the lacquer, was 9% by weight (8.3% by weight $SiO_2$+0.7% by weight polyethylene glycol). The test results are also reproduced in Table 3.

TABLE 3

| Example No. | Flatting-agent concentration (% by weight) | Viscosity (mPa · s) |
| --- | --- | --- |
| 1a | 9 | 1405 |
| 2 | 0 | 3795 |
| 3 | 9 | 3950 |
| 11 | 9 | 3715 |
| 12 | 9 | 3880 |
| 13 | 9 | 4125 |
| 14 | 9 | 3950 |

The thorough testing of the lacquers in Examples 1a, 2, 3, and 11 to 14 produced no disadvantageous results as regards delay in drying, the dispersion state of the flatting agent and transparency.

We claim:

1. In a method for preparing thixotropic paint and lacquer compositions which contain polyamide-modified alkyd resin and a silica flatting agent, the improvement comprising mixing with said polyamide-modified alkyd resin, a silica flatting agent and from about 1 to 25% by weight polyol based on the combined weight of said flatting agent and said polyol, whereby the thixotropic properties of said compositions are not adversely affected and the flatting agent remains dispersible for extended periods of storage.

2. The method of claim 1 wherein the amount of polyol ranges from 3 to 15% by weight.

3. The method of claim 1 wherein 1 to 25% by weight of wax, based on the combined weight of wax, silica flatting agent and polyol, is blended with said flatting agent before said flatting agent is mixed with said alkyd resin.

4. The method of claim 3 wherein said wax is selected from the group consisting of microcrystalline hard waxes, polyethylene waxes and mixtures thereof.

5. The method of claim 1 wherein said silica is selected from the group comprising silica gel, precipitated silicic acid, pyrogenic silica, and dialytic silicic acid.

6. The method of claim 1 wherein said polyol is selected from the group comprising di-to hexahydric alcohol having 2 to 100 carbon atoms and mixtures thereof.

7. The method of claim 1 wherein said polyol is selected from the group consisting of glycerin, ethylene glycol, diethylene glycol, polyethylene glycols, sorbitol, trimethylolpropane, ditrimethylolpropane, ethoxylated trimethylolpropanes, pentaerythritol and ethoxylated pentaerythritols.

8. Thixotropic paint and lacquer compositions which contain polyamide-modified alkyd resin and a silica flatting agent, the improvement comprising preparing by mixing with said polyamide-modified alkyd resin, a silica flatting agent and from about 1 to 25% by weight polyol based on the combined weight of said flatting agent and said polyol, whereby the thixotropic properties of said compositions are not adversely affected and the flatting agent remains dispersible for extended periods of storage.

* * * * *